Sept. 1, 1959  W. A. BEAUCHAMP  2,902,122
DOORS FOR BOX CARS
Filed April 16, 1957  3 Sheets-Sheet 1
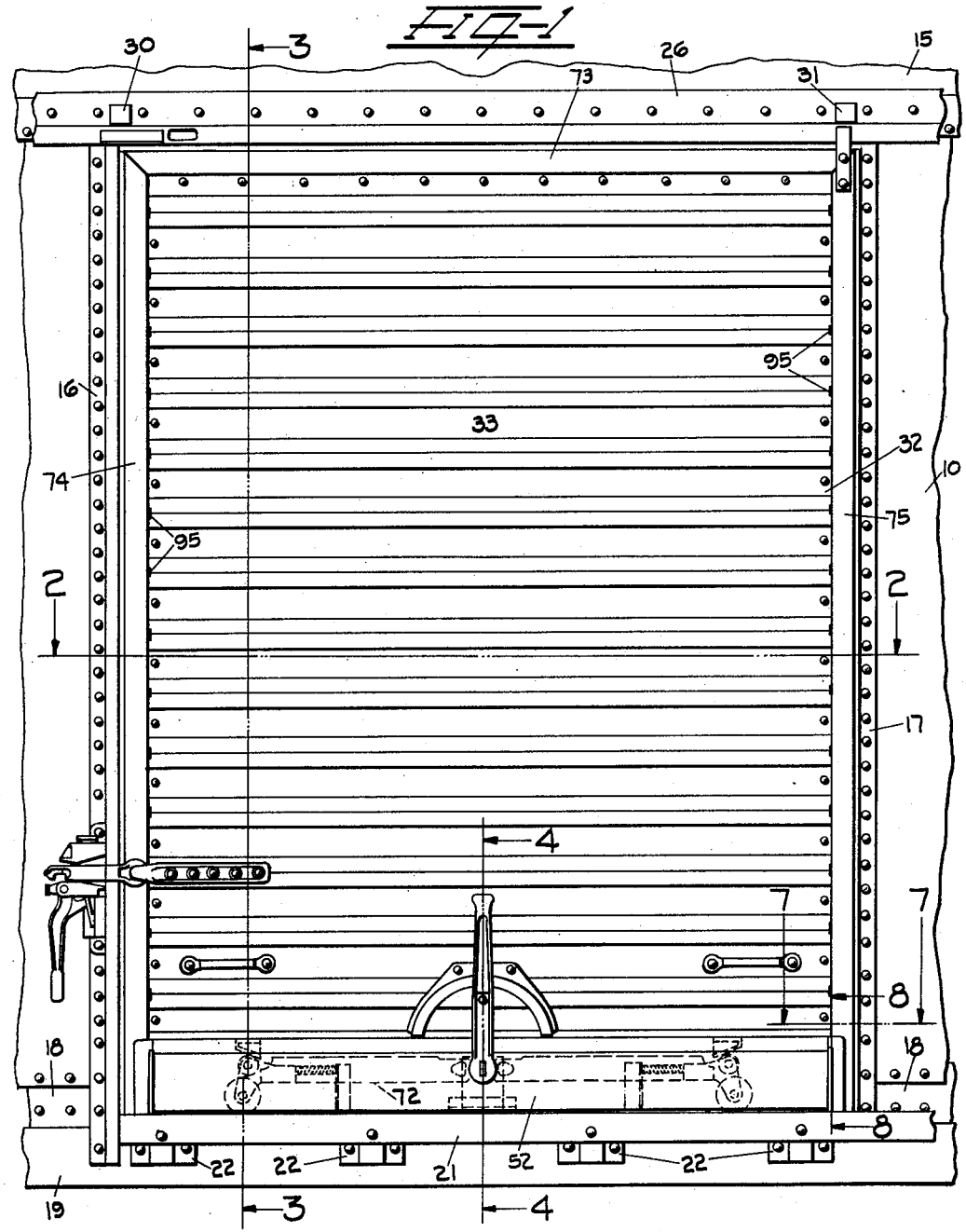
INVENTOR
WILFRED A. BEAUCHAMP
BY Samuel Reese
ATTY Sept. 1, 1959     W. A. BEAUCHAMP     2,902,122
DOORS FOR BOX CARS
Filed April 16, 1957     3 Sheets-Sheet 2
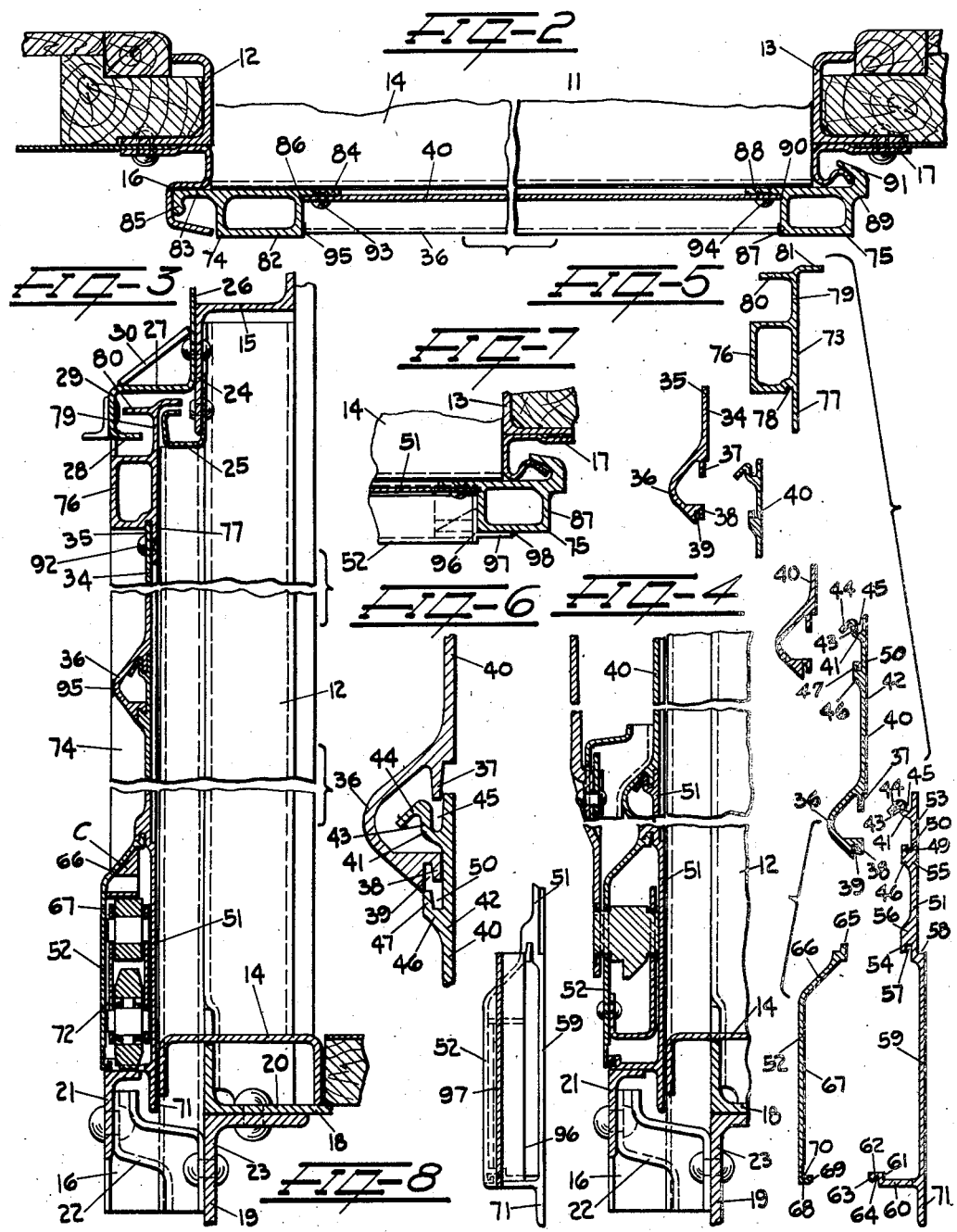
INVENTOR
WILFRED A. BEAUCHAMP
BY Samuel Reese
ATTY.

Sept. 1, 1959
W. A. BEAUCHAMP
2,902,122
DOORS FOR BOX CARS
Filed April 16, 1957
3 Sheets-Sheet 3
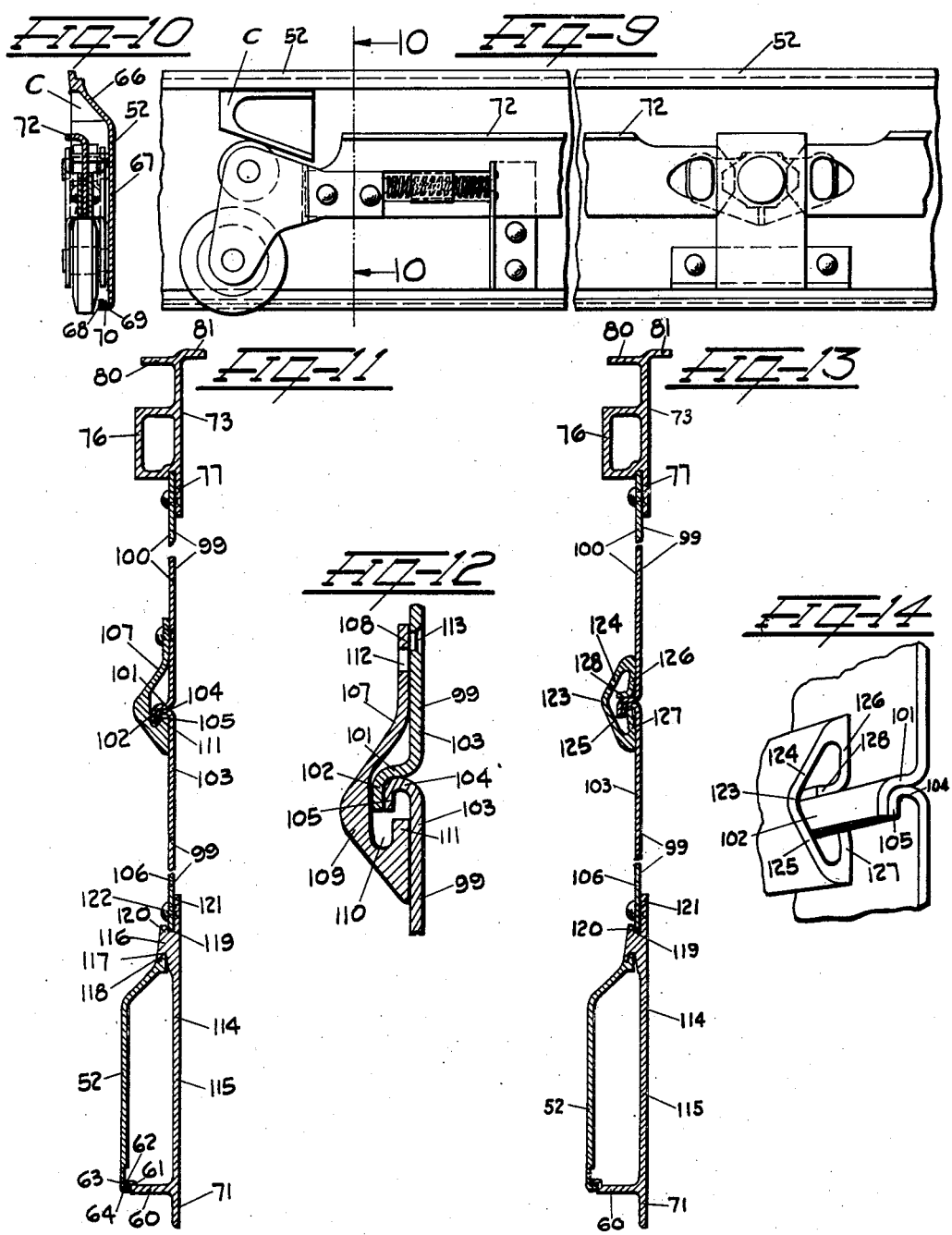
INVENTOR
WILFRED A. BEAUCHAMP
BY Samuel Resse
ATTY.

United States Patent Office 2,902,122
Patented Sept. 1, 1959

2,902,122

DOORS FOR BOX CARS

Wilfred A. Beauchamp, Chicago, Ill., assignor to The Youngstown Steel Door Company, Cleveland, Ohio, a corporation of Ohio Application April 16, 1957, Serial No. 653,179

14 Claims. (Cl. 189—46)

This invention relates to doors for box cars and is concerned primarily with doors of light weight formed of aluminum and the like and more particularly of aluminum extrusions.

It is an object of this invention to provide box car doors of light weight.

A further object is to provide box car doors formed of aluminum and similar light weight materials.

A further object is to provide box car doors formed of a plurality of extrusions of aluminum and the like.

A further object is to provide box car doors formed of a plurality of extrusions of aluminum and the like designed to be interlocked to provide door panels adapted to be secured to extruded marginal reinforcing members to constitute complete doors.

A further object is to provide box car doors formed of a plurality of extrusions of aluminum and the like designed to be interlocked to provide door panels adapted to be secured to extruded marginal reinforcing members to constitute complete doors wherein the interlocking engagement of the panel extrusions are maintained by the securement of the panel to the marginal reinforcing members.

A further object is to provide box car doors formed of aluminum and the like wherein the lower portion of the door shall be formed of interlocking inner and outer sections to provide a tubular construction adapted to receive anti-friction supporting mechanism for the doors.

A further object is to provide box car doors of the character described immediately above wherein the outer section of the lower portion of the door shall be offset relative to the inner portion whereby the anti-friction door supporting mechanism may be sub-assembled to the outer section prior to its interlocking assembly with the inner section.

A further object is to provide box car doors formed of aluminum and the like wherein the lower portion of the door shall be formed interlocking inner and outer sections to provide a tubular construction and wherein the outer section and anti-friction supporting mechanism for the door shall constitute a unit capable in the event that repairs are required of disassembly from and assembly with the inner section without removing the doors from the cars.

A further object is to provide doors of the character indicated in which precision of component parts and ease of assembly are obtained.

A further object is to provide box car doors formed of a plurality of extrusions of aluminum and the like designed to be interlocked to provide door panels wherein the top and bottom interlocking portions of the extrusions shall be so constructed as to strengthen the extrusions and add strength and stability to the panels formed from the extrusions.

A further object is to provide box car doors formed of a plurality of extrusions of aluminum and the like designed to be interlocked to provide door panels adapted to be secured to extruded marginal reinforcing members to constitute complete doors wherein a high degree of standardization of the component parts of the doors is achieved.

A further object is to provide box car doors formed of a plurality of extrusions of aluminum and the like designed to be interlocked to provide door panels having smooth interior surfaces lying in a single plane adapted to be secured to extruded marginal reinforcing members to constitute complete doors.

Other objects of the invention will become clear as the description thereof proceeds.

In the drawings forming part of this specification:

Fig. 1 is a fragmentary elevation of a side wall of a box car equipped with a door embodying the instant invention.

Fig. 2 is a horizontal section taken on line 2—2 of Fig. 1, a portion being broken away so as to permit an increase in the scale of this view.

Fig. 3 is a vertical section taken on line 3—3 of Fig. 1, parts being broken away to permit an increase in the size of this view.

Fig. 4 is a vertical section taken on line 4—4 of Fig. 1.

Fig. 5 is a fragmentary disassociated vertical section of component parts of a door.

Fig. 6 is a fragmentary vertical section showing the position of two extruded panel sections prior to their interlocking engagement.

Fig. 7 is a horizontal section taken on line 7—7 of Fig. 1.

Fig. 8 is a vertical section taken on line 8—8 of Fig. 1.

Fig. 9 is a fragmentary inside elevation of a unit assembly of the door anti-friction supporting mechanism and the outer section of the bottom tubular construction of the door.

Fig. 10 is a vertical section taken on line 10—10 of Fig. 9.

Fig. 11 is a fragmentary vertical section showing a modified form of the invention.

Fig. 12 is a partial vertical section showing the manner of assembly of the panel sheets of the door illustrated in Fig. 11.

Fig. 13 is a fragmentary vertical section illustrating another form of the invention.

Fig. 14 is a partial perspective view showing the mode of assembly of the panel sheets of the door shown in Fig. 13.

Referring to the embodiment of the invention illustrated in Figs. 1 to 10, inclusive, the numeral 10 designates a portion of a side wall of a railway box car which is provided with the conventional door opening 11. The horizontal extent of this door opening is defined by means of front and rear channel-shaped door posts 12 and 13. The vertical extent of the door opening 11 is defined by means of a threshold plate 14 and a side plate 15 of any desired construction.

Secured to the front door post 12 and extending outwardly therefrom is a front door stop 16 which is adapted to cooperate with the door of the instant invention in order to seal the forward margin of the door. Secured to the rear door post 13 is a combined post protection angle and spark strip 17 which as hereinafter described is adapted to cooperate with the door embodying the instant invention to provide a seal for the rear edge of the door.

The threshold plate 14 is supported upon the customary angle side sill 18 which is reinforced by a channel-shaped member 19 secured in any desired manner to the inwardly extending horizontal leg 20 of the side sill. A door supporting track 21 is carried by the side wall by means of a plurality of spaced track brackets 22 which are secured to and project outwardly from the web 23 of the side sill reinforcement.

The side plate 15 is customarily provided with a downwardly extending flange 24 to which a substantially J-shaped header 25 is secured and positioned in the manner illustrated in Fig. 3 of the drawings. A top door retaining member 26 is secured to the flange 24 of the side plate and projects outwardly therefrom in the form of a substantially channel-shaped member formed by the spaced flanges 27 and 28 and the vertical web 29. The top door retainer 26 is reinforced by means of angularly disposed plates 30 and 31 which are welded to the door retainer.

The door opening 11 hereinabove described is adapted to be closed by means of a door 32 which embodies the instant invention. The door 32 is of light weight and is formed of aluminum or like light material. In the considered embodiment of the invention the door 32 embodies a metallic panel 33 which is formed of a plurality of extrusions in order to insure precision of construction. The panel 33 embodies a top extrusion 34 the upper portion of which is in the form of a flange 35. The lower portion of the top extrusion is in the form of an outwardly extending corrugation 36. A flange 37 projects downwardly from the upper portion of the corrugation 36 preferably in outwardly offset relationship to the inner surface of the flange 35 by an amount equal to the thickness of the body portion of the plurality of intermediate sections embodied in the panel which are hereinafter described. A flange 38 projects downwardly from the lower portion of the corrugation 36 in vertical alignment with the flange 37 and in spaced relationship to the corrugation 36 so as to form a downwardly opening groove 39.

As indicated above the door panel embodies a plurality of intermediate sections 40, these sections being identical and in the form of extrusions. Each of these intermediate sections embodies a flange 41 which extends outwardly from the body portion 42 below the upper edge of the section. A flange 43 extends upwardly from the flange 41 and terminates below the upper edge of the section. From the latter flange a flange 44 extends outwardly and downwardly so that in its relationship to the adjacent upper section it will lie in proximate relationship to the upper portion of the corrugation formed on said upper section. In this manner the described flanges serve not only to reinforce the upper portion of the intermediate sections but also to reinforce and add stability to the entire panel formed of the extruded sections.

It will be observed that the body portion 42 cooperates with the upwardly extending flange 43 which is spaced from the body portion to provide a groove 45.

Below the flanges described immediately above the body portion 42 of the intermediate extruded section is formed with an outwardly extending flange 46 from which a flange 47 extends upwardly in alignment with the flange 43 and in spaced relationship to the body portion. A groove 50 is thereby provided.

The lower portion of each of the extruded intermediate sections is similar in construction to the lower portion of the upper section 34. Thus the lower portion of each of the intermediate sections contains an outwardly extending corrugation 36, a downwardly projecting flange 37 spaced outwardly from the inner surface of the body portion, a downwardly extending flange 38 aligned with the flange 37 and a groove 39.

The panel 33 is completed by means of a lower extruded portion which is formed in two sections, an inner section 51 and an outer section 52 which is interlocked with the inner section as hereinafter explained. The upper portion 53 of the inner lower section is formed similar to the upper portion of the intermediate sections so that it has the flanges 41, 43 and 44 and the groove 45 of the upper portion of the intermediate sections as well as the flanges 46 and 49 and the groove 50 of the upper portion of the intermediate sections. Spaced vertically below the flange 49 and in alignment therewith is a flange 54 positioned outwardly of and in spaced relationship to the upper body portion 55 by means of an outwardly extending flange 56. A downwardly opening groove 57 is thereby provided. Below the flange 54 of the lower inner section is offset inwardly as indicated at 58 to provide a plane lower body portion 59. Above the lower edge of the body portion 59 a substantially horizontal flange projects outwardly. This flange is then flanged upwardly as indicated at 61 outwardly as indicated at 62 and downwardly as indicated at 63 in spaced relationship to the flange 61 so as to provide a downwardly opening groove 64.

The outer section 52 is formed at its upper margin with an upstanding flange 65. From this flange section 52 extends downwardly and outwardly as indicated at 66 and then downwardly as indicated at 67. The lower edge of flange 67 is flanged inwardly as shown at 68 and then upwardly as indicated at 69 in spaced relationship to the flange 67 so as to provide an upwardly opening groove 70.

The various extruded sections hereinbefore described can by reasons of their design be assembled very simply to form the panel of the door. The manner of assembly of the top intermediate and inner bottom extruded section is more clearly indicated in Fig. 6 of the drawings. The sections are related as shown in this figure whereupon they are moved relatively in a direction crosswise of the panel in order to effect an interlocking of the sections. When interlocked the downwardly extending flange 37 on each of the sections is received within the groove 45 from top to bottom of the door. The flange 38 of each section is received within the groove 50 of the next lower adjacent section while the upstanding flange 49 of each section which carries such flange is received within the groove 39 of the next adjacent upper section. It will be understood that preferably the flanges and grooves hereinabove referred to formed on the several extruded sections extend continuously along the sections. When interlocking of the sections has occurred as noted above the downwardly and outwardly extending flange 44 will lie in proximate relationship to the upper portion of the outwardly extending corrugation 36. Accordingly the flanges 44 serve to reinforce the corrugation and the complete panel and at the same time to increase the stability of the interlocked sections.

The inner and outer sections of the lower portion of the panel are similarly assembled and interlocked by means of relative movement between the sections crosswise of the sections. During this interlocking engagement the upper flange 65 of the outer section enters the groove 57 of the inner section and the lower flange 69 of the outer section enters the groove 64 of the inner section while the depending flange 63 of the inner section enters the groove 70 of the outer section. When the inner and outer sections have in this manner been interlockingly assembled they are retained as a unit by means of welding along the top and the bottom of the outer section. It may be mentioned that the flanges and grooves of the inner and outer sections of the lower portion of the door panel are also preferably continuous with the sections.

Reference has been made hereinabove to the fact that the outwardly extending substantially horizontal flange 60 is disposed above the lower edge of the inner section. Where a lift mechanism is utilized to support the door for movement along the track 21 the flange 60 serves when the door is in its lowermost position to support the door frictionally upon the track. The disposition of the flange 60 provides a flange 71 which as more clearly appears in Fig. 3 of the drawings is disposed behind the track 21 and between it and the threshold plate 14. Flange 71 accordingly serves to prevent disengagement of the lower portion of the door from the track regardless of whether the door is lowered or raised.

The lifting and supporting mechanism designated generally by the reference numeral 72 is described in detail in the patent to Madland, No. 2,475,507, granted July 5, 1949, to which reference is made and which is incorporated herein. The further detailed description of the mechanism is therefore not believed to be necessary except to state that the parts of the lift mechanism are preferably formed of aluminum or light weight material.

In accordance with the invention and by reason of the two-part construction of the lower portion of the door panel the lift mechanism 72 is sub-assembled with the outer extruded portion 52 of the lower portion of the panel. As illustrated in Figs. 9 and 10 of the drawings this sub-assembly embodies an aluminum casting C which is secured in any desired manner to the outwardly sloping and vertical flanges 66 and 67 of said outer section. In view of the construction hereinabove described the sub-assembled outer section and lift mechanism are assembled as a unit with the inner section of the lower portion of the panel. Accordingly, should it become necessary to repair or replace the lift mechanism the sub-assembly may be removed from the inner section without removing the door from the car and may when repairs are made be similarly replaced.

To complete the door 32, the panel 33 formed of the extruded sections hereinabove described are assembled with and reinforced by top and front and rear reinforcing members 73, 74 and 75 which are in the form of extrusions made of aluminum or light weight material. The top reinforcing member 73 embodies a sturdy rectangular box section 76 which extends substantially the width of the panel. A flange 77 extends downwardly from the box section in the inner plane thereof. Adjacent to the flange 77 box section 76 is formed with a downwardly opening groove 78 which is adapted to receive the upper portion of flange 35 of the top panel section 34. A flange 79 lying in vertical alignment with the flange 77 extends upwardly above the box section 76 and is formed at its upper end with outwardly and inwardly extending flanges 80 and 81. When the completed door is mounted upon the car the flange 79 as shown in Fig. 3 of the drawings lies between the inturned flange 28 of the top door retainer 26 and the header 25 while the flanges 80 and 81 lie in respective overlapping relationship with the flange 28 and the door header 25.

The extruded front vertical reinforcing member for the door panel is similarly provided with an outwardly extending sturdy box section 82 which is provided with oppositely extending flanges 83 and 84 lying in the inner plane of the box section. The flange 83 is turned outwardly to provide a flange 85 which is adapted when the door is closed to abut a portion of the front door stop 16 as shown in Fig. 2 of the drawings. An outwardly opening groove 86 is formed in the side of the box section 82 adjacent to the flange 84 and is adapted to receive the adjacent edges of the panel sections.

The rear extruded marginal reinforcing member 75 is similarly formed with an outwardly extending sturdy box section 87 which carries flanges 88 and 89 disposed in its inner plane. An outwardly opening groove 90 is formed in the box section 87 adjacent to the flange 88 for the purpose of receiving the adjacent edges of the panel sections. The flange 89 is turned inwardly and forwardly as indicated at 91 to provide a sealing flange which in the closed position of the door is adapted to cooperate with a portion of the combined post protection angle and spark strip in order to seal the rear edge of the door.

In assembled relationship the door panel 33 lies outwardly of the flanges 77, 84 and 88 and are secured thereto as by means of rivets 92, 93 and 94 or in any other desired manner. In addition to this securement the crests of the corrugations 36 of the top and intermediate panel sections which abut the box sections of the front and rear marginal panel reinforcing members have their crests welded to the box sections as indicated at 95.

As illustrated in Fig. 7 of the drawings the outer outwardly offset portion of the lower section of the door panel extends outwardly beyond the box sections of the front and rear vertical marginal reinforcing members. The spaces thereby provided between the vertical edges of the outer portion and the noted box sections are closed by means of aluminum or the like castings 96. These castings which conform to the contour of the outer portion 52 are provided with flanges 97 which as shown in Fig. 7 overlap the box sections 82 and 87 and are welded thereto as indicated at 98.

A modified form of the invention is illustrated in Figs. 11 and 12 of the drawings. This form of the invention utilizes top and side marginal reinforcing members similar to the reinforcing members 73, 74 and 75. In the considered embodiment, however, the panel 99 is formed of aluminum or the like sheets rather than extrusions. The top panel section 100 is straight as shown with the exception of its lower marginal portion. At this portion the panel section 100 is flanged outwardly as indicated at 101 and then downwardly as indicated at 102. Below the upper panel section are a pluarlity of intermediate panel sections one of which is shown at 103 whose main portion is straight, whose lower portion is formed with flanges 101 and 102 and whose upper portion is formed with outwardly and downwardly extending flanges 104 and 105. The door panel also contains a lower section 106, the main portion of which is straight while its upper portion is flanged to provide flanges 104 and 105.

The top, intermediate and lower panel sections are arranged in superimposed relationship in order to provide a complete panel. This relationship is such that the flanges 101 and 102 of an upper section are interlocked with the upper flanges 104 and 105 of a lower section. To maintain the indicated relationship between the panel sections a separate interlocking member 107 is utilized. This member embodies an upper vertical flange 108 and a lower outwardly curved section 109 similar in outline to the corrugation 36 hereinabove described. Intermediate of the width of the lower portion of the section 109 an upwardly opening groove 110 is formed in such a manner as to provide an upwardly extending flange 111 of a thickness susbtantially equal to the space between the main or body portion of a panel section and the downwardly extending flange 105 formed on the section.

The mode of assembly of the interlocking member 107 with adjacent superimposed panel sections is indicated in Fig. 12 of the drawings. The relationship of the adjacent panel sections is shown together with the position of the member 107 prior to its movement crosswise of the panel sections in order to secure the adjacent panel sections in their interlocking relationship. With the parts positioned as shown in Fig. 12 of the drawings the member 107 is moved upwardly or crosswise of the panel sections so that the interlocked vertical flanges 102 and 105 of the sections are disposed in the groove 110 of member 107 and the flange 111 is disposed within the groove formed between the panel section and the vertical flange 105. At this time the holes 112 and 113 which are provided in the upper panel section and in the member 107 are in alignment so that rivets may then be driven in order to secure the member 107 and the upper panel section together and to insure proper interlocking relationship between the adjacent upper and lower margins of the panel sections.

The door is completed by a lower extruded member 114 which extends between and is secured to the front and rear marginal reinforcing members by means of castings 96 in the manner hereinabove set forth in connection with the first described embodiment of the invention. The lower member of the door is essentially similar to the lower member of the door hereinabove described with the exceptions noted below. This lower member accordingly embodies outer and inner extruded sections 52 and 115. The outer section 52 has been described hereinabove. The inner section 115 is similar to the inner section 59 inasmuch as it embodies the outwardly extending flange 60, the vertical flanges 61 and 63, the horizontal flange 62 and the downwardly opening groove 64. It also embodies the inner vertical flange 71. The upper marginal portion of the inner extruded section 115, however, differs in construction from the inner section 59. Below its upper edge section 115 is formed with an outwardly extending flange 116 within the lower portion of which the downwardly opening groove 117 is formed so as to provide an outer downwardly extending flange 118. The upper portion of the flange 116 is formed with an upwardly opening groove 119 and an adjacent outwardly disposed vertical flange 120. The inner section is provided with a flange 121 which extends upwardly above the flange 116 to which the lower margin of the lower panel section is secured as by means of rivets 122.

The relationship between the top intermediate and lower panel sections and the vertical marginal reinforcing members is the same as that hereinabove set forth in the first described embodiment of the invention. Also the same relationship in the considered embodiment exists between the upper margin of the upper panel section and the top marginal reinforcing member. The portion 109 of the interlocking member 107 may also be welded at its ends to the sturdy box sections of the vertical marginal reinforcing members in the manner hereinabove described.

A further embodiment of the invention is illustrated in Figs. 13 and 14 of the drawings. The panel sections, the marginal reinforcing members and the lower portion of the door of this embodiment are the same as those illustrated in Figs. 11 and 12 of the drawings. The door of this embodiment of the invention distinguishes from the embodiment illustrated in Figs. 11 and 12 of the drawings by the structure and manner of interlocking the adjacent panel sections. In the considered embodiment a substantially outwardly curved member 123 is utilized which presents the appearance of a corrugation in the door. The upper and inner branches 124 and 125 of this member are flanged respectively downwardly and upwardly as indicated at 126 and 127. Additionally the flange 126 is flanged outwardly as indicated at 128.

The relationship between the interlocking member 123 and the interlocked flanges at the upper and lower margins of adjacent panel sections is illustrated in Fig. 13 of the drawings. To obtain this relationship the flanges on the panel sections are interlocked and the member 123 is then slid along the interlocked flanges lengthwise of the panel sections until its side edges coincide with the side edges of the panel sections. In this movement of the member 123 the flange 128 slides along the flange 101 of the upper section and the flange 127 slides along and within the space formed by the lower panel section and the flange 105. When the complete door panel, the marginal reinforcing members and the lower portion of the door have been assembled and fastened together the side edges of the interlocking members 123 may be butt welded to the box sections of the vertical reinforcing members as hereinabove described.

It will be apparent by reference to the drawings that the interlocking relationship between the panels in the three illustrated embodiments of the invention is such as to produce the panel which has a smooth interior. Moreover, the interlocking relationships described are of such nature as to add strength both vertically and horizontally to the completed door.

Adverting to the embodiment of the invention illustrated in Figs. 1 to 10, inclusive, of the drawings and particularly to the showing of Fig. 5 it will be observed that the flange 35 of the upper section 34 is straight. In addition to this the height of flange 35 can vary so that it can be made of the height necessary to obtain the desired height of panel. Securement of varying heights of door panel by variations in the height of flange 35 permits standardization of the intermediate panel sections and standardization of the lower panel section regardless of the overall height of door panel.

It will be apparent that numerous changes and modifications in the details of the invention will be clear to those skilled in the art. It is intended, therefore, that all such modifications and changes be comprehended within this invention which is to be limited only by the scope of the claims appended hereto.

I claim:

1. A door for railway box cars formed of aluminum and the like comprising an extruded panel, top and side extruded marginal reinforcing members, said panel being formed of upper, intermediate and bottom sections extending between said side marginal reinforcing members, the upper and lower margins of said sections being formed with complementary configurations having interlocking engagement, and means securing the marginal portions of said panel to said marginal reinforcing members, said bottom extruded panel section comprising releasably interlocked inner and outer members, said outer member being offset outwardly relative to said inner member and cooperating therewith to provide a box section adapted to receive anti-friction door supporting mechanism.

2. A door for railway box cars formed of aluminum and the like comprising an extruded panel, top and side extruded marginal reinforcing members, said panel being formed of upper, intermediate and bottom sections extending between said side marginal reinforcing members, the upper and lower margins of said sections being formed with complementary configurations having interlocking engagement, and means securing the marginal portions of said panel to said marginal reinforcing members, said bottom extruded panel section comprising releasably interlocked inner and outer members, said outer member being offset outwardly relative to said inner member and cooperating therewith to provide a box section adapted to receive anti-friction door supporting mechanism, said anti-friction mechanism being carried by said outer member, whereby said outer member and said anti-friction mechanism may be removed as a unit for repair from said door and replaced thereon without removing said door from the car upon which it is mounted.

3. A door for railway box cars formed of aluminum and the like comprising an extruded panel, top and side extruded marginal reinforcing members, said panel being formed of upper, intermediate and bottom sections extending between said side marginal reinforcing members, the upper and lower margins of said sections being formed with complementary configurations having interlocking engagement, and means securing the marginal portions of said panel to said marginal reinforcing members, said bottom extruded panel section comprising releasably interlocked inner and outer members, said outer member being offset outwardly relative to said inner member and cooperating therewith to provide a box section adapted to receive anti-friction door supporting mechanism, said inner member having an outwardly extending flange above its lower edge with which said outwardly offset portion of said outer member is interlocked, said outwardly extending flange being adapted to be frictionally seated upon a track for supporting said door independently of said outer member and said anti-friction mechanism, said mechanism being of the lift type.

4. An extruded door for railway box cars formed of aluminum and the like comprising a reinforcing frame embodying top and side extruded members having inwardly extending flanges, a panel formed of top, intermediate and bottom extruded sections and means securing said extruded panel sections to said flanges of said reinforcing frame, an outwardly projecting corrugation extending along the lower portion of each of said intermediate sections, a flange extending downwardly from and along the upper part of said corrugation and a groove extending upwardly into and along the lower portion of said corrugation so as to provide a downwardly extending flange inwardly of said groove, the upper portion of each of said intermediate sections having a flange extending along said section spaced outwardly from and cooperating therewith to provide an upwardly opening groove, a second flange extending along said upper portion of each of said intermediate sections spaced outwardly therefrom and cooperating therewith to provide a second upwardly opening groove lying below said first mentioned upwardly opening groove, said intermediate sections being assembled by relative sliding movement crosswise of said sections so that said flanges on said corrugations are received within said grooves on said upper portion of said sections and said outwardly offset flanges on said upper portion of said sections are disposed outwardly of said flanges on said corrugations to interlock said intermediate sections, the lower portion of the top section being of similar form to said lower portion of said intermediate sections and being similarly assembled with the adjacent intermediate section and the upper portion of said bottom section being of similar form to said upper portion of said intermediate sections and being similarly assembled with the adjacent intermediate section.

5. An extruded door for railway box cars formed of aluminum and the like comprising a reinforcing frame embodying top and side extruded members, a panel formed of top, intermediate and bottom extruded sections and means securing said extruded panel sections to said members of said reinforcing frame, an outwardly projecting corrugation extending along the lower portion of each of said intermediate sections, a flange extending downwardly from and along the upper part of said corrugation, a flange extending along and downwardly from the lower portion of said corrugation, the upper portion of each of said intermediate sections having outwardly vertically spaced upwardly opening grooves extending along said sections, said intermediate sections being assembled by relative sliding movement crosswise of said sections so that said flanges on said corrugations are received within said grooves to interlock said intermediate sections, the lower portion of the top section being of similar form to said lower portion of said intermediate sections and being similarly assembled with the adjacent intermediate section and the upper portion of said bottom section being of similar form to said upper portion of said intermediate sections and being similarly assembled with the adjacent intermediate section.

6. The combination as defined in claim 5 wherein the flanges extending from said corrugations are in vertical alignment and spaced outwardly from the body of said sections a distance equal to the thickness of said body whereby a smooth inner surface is provided on said panel.

7. The combination as defined in claim 4 wherein said first mentioned outwardly spaced flanges extending along said upper portion of said intermediate and bottom section are formed with outwardly extending flanges disposed in proximate relationship to the upper portions of said corrugations.

8. A door for box cars formed of aluminum and the like comprising a panel and top and side marginal reinforcing members, said panel being formed of a plurality of vertically arranged sections extending between said side marginal reinforcing members, said sections being formed with complementary configurations which are interlocked when said sections are assembled to form said panel, and means securing the marginal portions of said panel to said marginal reinforcing members, said bottom panel section being formed of outer and inner members interlocked independently of the other panel sections, said outer member being offset outwardly relative to said inner member and cooperating therewith to provide a box section adapted to receive anti-friction means for supporting said door.

9. As an article of manufacture an extruded panel member for box car doors formed of aluminum and the like comprising a body portion, an outwardly projecting corrugation extending along the lower portion of said body portion, a flange extending downwardly from the upper part of said corrugation, a groove extending upwardly into and along the lower part of said corrugation and providing a downwardly extending flange inwardly of said groove, a flange extending along the upper margin of said body portion in outwardly spaced relationship and cooperation with said body portion to provide an upwardly opening groove, a second flange extending along said body portion below said last mentioned flange in outwardly spaced relationship and cooperating with said body portion to provide an upwardly opening groove.

10. A combination as defined in claim 9 wherein the first mentioned flange extending along the upper margin of said body portion is formed with an outwardly extending flange which is adapted to lie in proximate relationship with the upper part of the corrugation of an upper adjacent extruded panel member.

11. As an article of manufacture an extruded panel member for a box car door formed of aluminum and the like comprising inner and outer interlocked sections, said inner section having a body portion, a downwardly projecting flange extending along said body portion in spaced relationship and cooperating with said body portion to provide a downwardly opening groove and an outwardly projecting flange extending along said body portion below said first mentioned flange, said outwardly projecting flange being flanged upwardly, then outwardly, and then downwardly in spaced relationship to said upwardly extending flange to provide therewith a downwardly opening groove, said outer section having upwardly extending flange, a flange inclined outwardly and downwardly from and along said latter flange and a flange extending along and downwardly from said inclined flange, said latter downwardly extending flange being flanged inwardly and then upwardly to provide an upwardly opening groove, said flanges and grooves of said sections being interlocked by relative movement crosswise of said sections to provide a box section and means securing said sections together in interlocked relationship.

12. The combination as defined in claim 11 wherein said outwardly projecting flange of said inner section constitutes a frictional supporting member for a box car door and is disposed above the lower edge of said body portion of said inner section.

13. An extruded door for railway box cars formed of aluminum and the like comprising a reinforcing frame embodying top and side extruded members having inwardly extending flanges, a panel formed of top, intermediate and bottom extruded sections and means securing said extruded panel sections to said flanges of said reinforcing frame, the lower portion of said intermediate sections comprising an outwardly projecting corrugation, a flange extending downwardly from and along the upper part of said corrugations, the upper portion of said intermediate sections having a flange extending therealong in outwardly spaced relationship therewith to provide upwardly opening grooves adapted to receive said flanges of said intermediate sections, the lower part of said corrugations and said upper portion of said intermediate sections having cooperating grooves and flanges, said intermediate sections being assembled by relative movement crosswise of said sections so that said flanges on said corrugations are received within said grooves on said upper portion of said sections and said grooves and flanges on said lower part of said corrugations and said upper portion sections cooperate to interlock said intermediate sections, the lower portion of said top section being of similar form to said lower portion of said intermediate sections and being similarly interlocked with the upper portion of the adjacent intermediate section and the upper portion of said bottom section being of similar form to said upper portion of said intermediate section and being similarly interlocked with the lower portion of the adjacent intermediate section.

14. A door for railway box cars formed of aluminum and the like comprising an extruded panel and top and side extruded marginal reinforcing members, said panel being formed of upper, intermediate and bottom vertically arranged sections extending between said side marginal reinforcing members, the upper and lower margins of said sections being formed with spaced flanges and grooves having interlocking engagement by movement crosswise of said sections, and means securing the marginal portions of said panel to said marginal reinforcing members.

References Cited in the file of this patent

UNITED STATES PATENTS

| | | |
|---|---|---|
| 1,925,655 | Ditchfield | Sept. 5, 1933 |
| 2,257,513 | Pilcher | Sept. 30, 1941 |
| 2,682,075 | Dietrichson | June 29, 1954 |
| 2,774,118 | Nystrom | Dec. 18, 1956 |
| 2,776,736 | Aaron | Jan. 8, 1957 |
| 2,804,953 | Buehler | Sept. 3, 1957 |